Jan. 24, 1967     L. DION     3,300,032
FORAGE HOPPER WITH AUGER MEANS
Filed Oct. 16, 1964
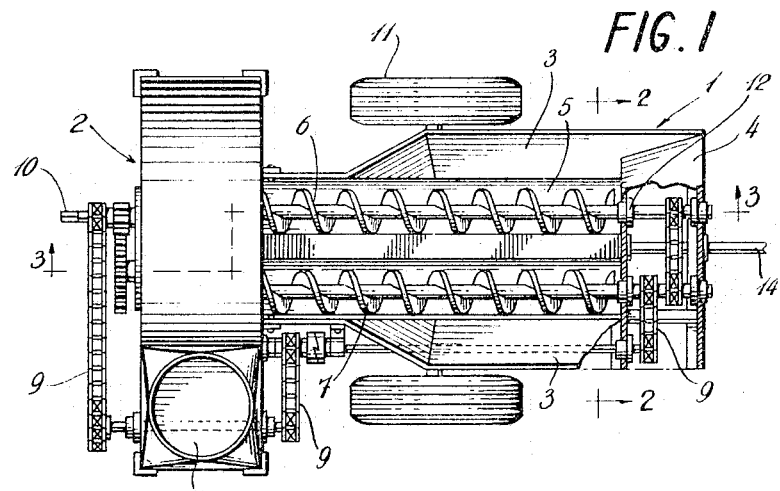
INVENTOR
Lucien DION
BY
ATTORNEYS

3,300,032
FORAGE HOPPER WITH AUGER MEANS
Lucien Dion, 26 Morris St., Ste. Therese de Blainville, Quebec, Canada
Filed Oct. 16, 1964, Ser. No. 404,328
1 Claim. (Cl. 198—213)

This invention relates to improvements in forage hoppers with auger means, particularly of the type for grinding and feeding green forage or the like materials into a blower.

The known forage hoppers of this kind generally comprise semi-cylindrical troughs at their bottom with auger means being centrally journalled in said troughs. However, this construction has been found unsatisfactory, especially when green forage is to be ground and fed into the blower, because during such operation this material excretes a juice which produces bunching of the forage, its adherence to the walls of the troughs and clogging of the latter. This also results in a substantial waste of power.

Experience has shown that the excretions are particularly severe and damageable when the forage is only partially dry because in such instances they are in the form of a thick caramel like material of which the agglomerating and adhesive power is such as to necessitate frequent and repeated stoppages of the feeder for cleaning by means of water. These stoppages have come to be accepted by most operators, who tend to consider them as a necessary and unavoidable evil. Thus, the efficiency of the machine is considerably improved by the present invention because it succeeds in reducing the maintenance downtime and man-hour losses to a new low.

The principal object of the instant invention is, therefore, to overcome the above mentioned disadvantages by providing an improved forage hopper with auger feeding means.

Another object of the invention is to overcome said disadvantages in a very simple and economical manner.

The operation of the forage hoppers with rotating auger means mounted in troughs is well known. When the forage is charged into the hopper, it is drawn by said auger means at one side of the trough, rotated within said trough and expelled at the other side thereof closer to the blower into which it is to be fed. This step is, of course, continuously repeated as the auger means rotate and the forage is advanced towards and fed into the blower positioned at the outlet end of the hopper. During the rotation of the auger means the auger blades are provided alternatively with a descending motion and an ascending one, the forage being drawn into the trough by the former and expelled therefrom by the latter.

It has been noticed that when the augers are journalled centrally in the troughs, the bunching and adherence of the forage is mostly produced at the expelling end of said troughs where the ascending motion of the auger blades is performed. According to the invention this difficulty is overcome by mounting the auger means eccentrically and so that there is more space left between the wall of the trough and the blades of the auger means at the expelling side of said trough. In other words, during rotation of the auger means the part of the auger blades with ascending motion must be farther from the wall of the trough than the part with the descending motion. Also, it is particularly advantageous to shift the auger means off center as much as possible in the above indicated manner.

It has been found that when the auger means are so journalled in the troughs, feeding of green forage into the blower and its partial grinding proceed normally without excessive bunching, adherence or harmful clogging.

The invention will now be described in detail with reference to the appended drawings in which:

FIG. 1 represents a plan view of the hopper according to the invention, partly broken to show its driving arrangement, in combination with a blower;

FIG. 2 is a section view of said hopper taken along line 2—2 of FIG. 1; and

FIG. 3 is a section view of the hopper and blower combination taken along line 3—3 of FIG. 1.

As shown in FIG. 1, forage hopper 1, which is attached to blower 2, comprises lateral walls 3 and a transversal end wall 4. The major portion of walls 3 as well as wall 4 are inclined so as to make the hopper taper towards the bottom where it ends with two troughs 5, separated by a platform 8, in which augers 6 are journalled, for instance, on ball bearings 12. As clearly indicated, these augers are mounted eccentrically and are driven by means of a driving mechanism 9 connected through shaft 10 to a motor (not shown). The same motor is usually used to operate both the blower and the augers.

The hopper 1 is supported on wheels 11 and can be attached to a tractor or the like vehicle by rod 14.

The position of the augers and particularly that of their blades 7 is especially well illustrated in FIG. 2. It is shown in this figure that at the drawing sides of the troughs there are provided short protruding portions 15 and 15a and that the augers are so offset from the center of the troughs as to almost touch these protruding portions with the edges of their blades 7. For instance, using auger blades with 6 inches diameter and 6 inches pitch, excellent results have been obtained by mounting the augers in the troughs so that there is ¼ of an inch gap between the edges of the blades 7 and the walls of the troughs 5 just below the protruding portions 15 and 15a and 1½ inches gap between the edges of said blades and the outlet sides 16 and 16a of the troughs. In such cases, the protruding portions 15 and 15a are slightly shorter than ¼ of an inch.

In FIG. 3, it is illustrated that the motor (not shown) connected to shaft 10 can also be used to drive the blower fan 17 and that the blower 2 is pivotally attached at 18 to the hopper 1 so that during transportation of the latter the blower can be pivoted as indicated by the arrow, and still remain attached to the hopper.

During the operation of the entire mechanism, green forage is charged into the hopper 1, it is ground and fed through inlet 19 into the blower 2 from which it is discharged by outlet 13.

No bunching, adherence to the apparatus or clogging of the augers has been experienced with the arrangement of the instant invention particularly when green forage with about 40% moisture was used.

From the above description it is also evident that the improved results are achieved in a simple manner and without any increase in cost of the apparatus.

It will, of course, be understood that the invention is not limited to the specific embodiment described above and illustrated in the appended drawings, but that different modifications evident to those skilled in the art may be applied without departing from the spirit of the invention.

Thus, any appropriate number of troughs and auger means can be used, the dimensions of these may vary and the eccentricity of the auger means in the troughs may also be more or less pronounced, but sufficient to obtain the desired result. Also, the platform between the troughs may be of any required configuration.

The invention should therefore be limited only by the scope of the following claim.

I claim:

In a forage hopper with substantially semi-cylindrical troughs and auger means rotatably mounted therein, the forage charged into the hopper being drawn by said auger means at one side of the trough and expelled at the other during the rotation of the auger means, the improvement whereby the trough comprises at the drawing side thereof a short protruding portion and the auger means is so off-centered as to nearly touch said portion with its edge.

References Cited by the Examiner

UNITED STATES PATENTS

| | | | |
|---|---|---|---|
| 1,866,005 | 7/1932 | Beaty | 198—213 |
| 2,410,501 | 11/1946 | Huddle | 302—37 |
| 2,488,626 | 11/1949 | Hansen | 302—37 |
| 3,195,742 | 7/1965 | Sime | 214—17.84 |

ANDRES H. NIELSEN, *Primary Examiner.*